United States Patent
Cheng

(10) Patent No.: US 9,490,924 B2
(45) Date of Patent: Nov. 8, 2016

(54) PROMPTING METHOD AND WIRELESS DEVICE

(71) Applicant: Wistron Corporation, New Taipei (TW)

(72) Inventor: Yang-Da Cheng, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 14/826,214

(22) Filed: Aug. 14, 2015

(65) Prior Publication Data

US 2016/0285570 A1    Sep. 29, 2016

(30) Foreign Application Priority Data

Mar. 24, 2015  (TW) .............................. 104109418 A

(51) Int. Cl.
 *H04B 17/00* (2015.01)
 *H04B 17/318* (2015.01)
 *H04B 1/10* (2006.01)

(52) U.S. Cl.
 CPC .......... *H04B 17/318* (2015.01); *H04B 1/1027* (2013.01)

(58) Field of Classification Search
 CPC .......... H04B 17/0057; H04B 17/0062; H04B 1/1027; H04B 17/006; H04B 17/004

USPC ......... 455/67.11, 67.13, 115.1, 115.3, 226.1, 455/226.2, 226.3, 550.1
 See application file for complete search history.

(56) References Cited

U.S. PATENT DOCUMENTS

| | | | |
|---|---|---|---|
| 2006/0068731 A1 | 3/2006 | Seier | |
| 2009/0233641 A1* | 9/2009 | Kanazawa | H04B 17/23 455/550.1 |
| 2011/0081870 A1* | 4/2011 | Watanabe | H04W 56/00 455/67.11 |
| 2014/0347224 A1* | 11/2014 | Hokazono | G01S 11/06 342/458 |
| 2016/0014807 A1* | 1/2016 | Ghosh | H04W 74/002 370/329 |

OTHER PUBLICATIONS

Office action mailed/issued on Aug. 23, 2016 for TW application No. 104109418, filing date: Mar. 24, 2015, p. 1 line 12-14, pp. 2 and p. 3 line 1-16.

* cited by examiner

*Primary Examiner* — Nhan Le
(74) *Attorney, Agent, or Firm* — Winston Hsu; Scott Margo

(57) ABSTRACT

A prompting method utilized in a wireless device is disclosed. The prompting method includes obtaining a signal strength value corresponding to a wireless system; and outputting a prompting signal, the prompting signal having a prompting signal characteristic for reflecting the signal strength value.

20 Claims, 3 Drawing Sheets

PROMPTING METHOD AND WIRELESS DEVICE

BACKGROUND OF THE INVENTION

1. Field of the Invention

The present invention relates to a prompting method and a wireless device, and more particularly, to a prompting method and a wireless device capable of prompting users about variation of wireless signal strength.

2. Description of the Prior Art

As the technology evolves, wireless devices such as smart phones, tablets, etc., become an important part of human life. People may utilize the wireless devices via a wireless cellular system (e.g., the 2G/3G/4G wireless communication system) or a wireless local area network system (e.g., Wi-Fi) to perform functions such as voice call, web browsing, passing instant messages on the social network, information inquiry, etc. Received signal quality is highly related to a location of the wireless device and an angle of an antenna of the wireless device. When the received signal quality is bad, the location of the wireless device may be moved or the angle of the antenna may be rotated to obtain better received signal quality. In general, the signal strength is shown in a monitor of the wireless device, a user has to stare at the monitor so as to grasp the variation condition of the signal strength. However, under the condition of the user staring the monitor, the rotated angle of the wireless device is limited. In addition, the user may neglect obstacles in a neighborhood of the wireless device when moving the wireless device, and cause dangers. Therefore, there is a need to improve the prior art.

SUMMARY OF THE INVENTION

It is therefore a primary objective of the present invention to provide a prompting method and a wireless device capable of prompting users about variation of wireless signal strength.

An embodiment of the present invention discloses a prompting method, utilized in a wireless device, the prompting method comprising obtaining a signal strength value corresponding to a wireless system; and outputting a prompting signal, the prompting signal having a prompting signal characteristic for reflecting the signal strength value.

An embodiment of the present invention further discloses a wireless device, comprising an output module; a wireless module, configured to receive a signal from a wireless system and measure a signal strength value of the wireless system; a processor, coupled to the output module and the wireless module; and a storage unit, for storing a program code, the program code instructing the processor to perform following steps: obtain the signal strength value corresponding to the wireless system; and control the output module to output a prompting signal, the prompting signal having a prompting signal characteristic for reflecting the signal strength value.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
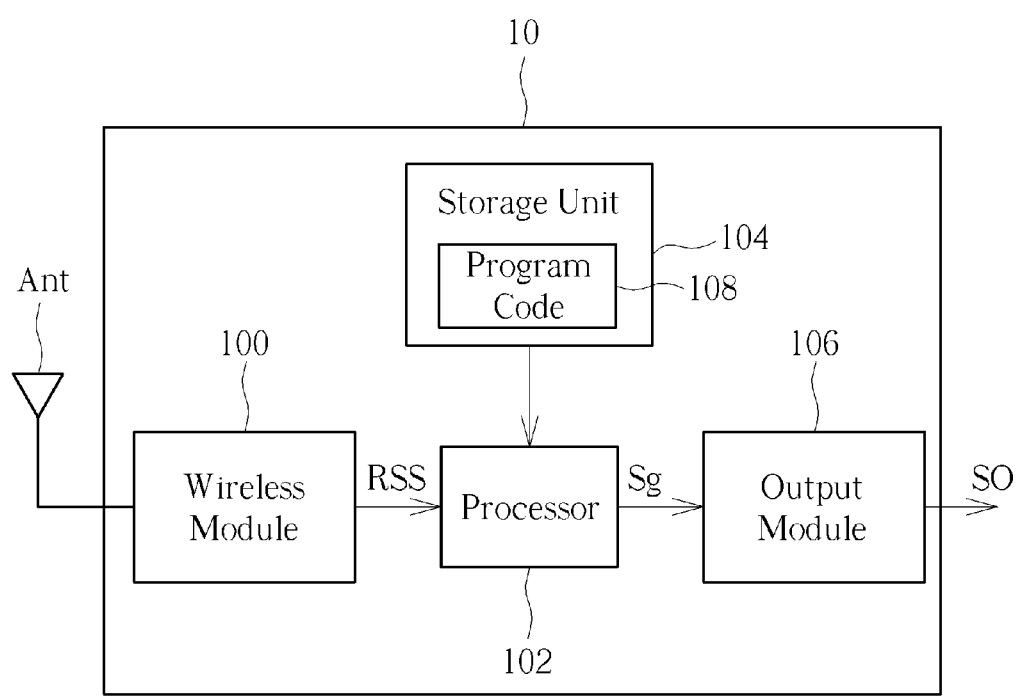
FIG. 1 is a schematic diagram of a wireless device according to an embodiment of the present invention.

FIG. 1 is a schematic diagram of a wireless device 10 according to an embodiment of the present invention. The wireless device 10 may be a wireless device capable of performing wireless transmission via antennas and a wireless system, such as a smart wearable device (e.g., smart watch), smart phone, table computer, etc. The wireless system is selected from a wireless body area network system, a wireless personal area network system, a wireless local area network system, a wireless metropolitan area network, a wireless cellular system, or a wireless positioning system. The wireless device 10 comprises a wireless module 100, a processor 102, a storage unit 104 and an output module 106. the wireless module 100 is coupled to an antenna Ant of the wireless device 10, for receiving wireless signals from the wireless system, measuring a signal strength value RSS corresponding to the wireless system, and sending the signal strength value RSS to the processor 102. The processor 102 generates a prompting information Sg according to the signal strength value RSS and sends to the output module 106, and the output module 106 generates a prompting signal SO according to prompting information Sg. Moreover, the prompting signal SO comprises a prompting signal characteristic CH, for reflecting the signal strength value RSS, such that an user may determine a variation condition of the signal strength value RSS according to the prompting signal characteristic CH of the prompting signal SO. For example, the prompting signal SO may be a sound signal snd, the prompting signal characteristic CH of the sound signal snd may be a tone tn of the sound signal snd, and the output module 106 may be a speaker module. In such a situation, the processor 102 may generate the sound signal snd with different tone tn to the speaker module according to the various signal strength value RSS, and thus, the speaker module may generate sounds with the different tone tn, such that the user may determine the variation condition of the signal strength value RSS according to the different tone tn of the prompting signal SO.

Figure 2:
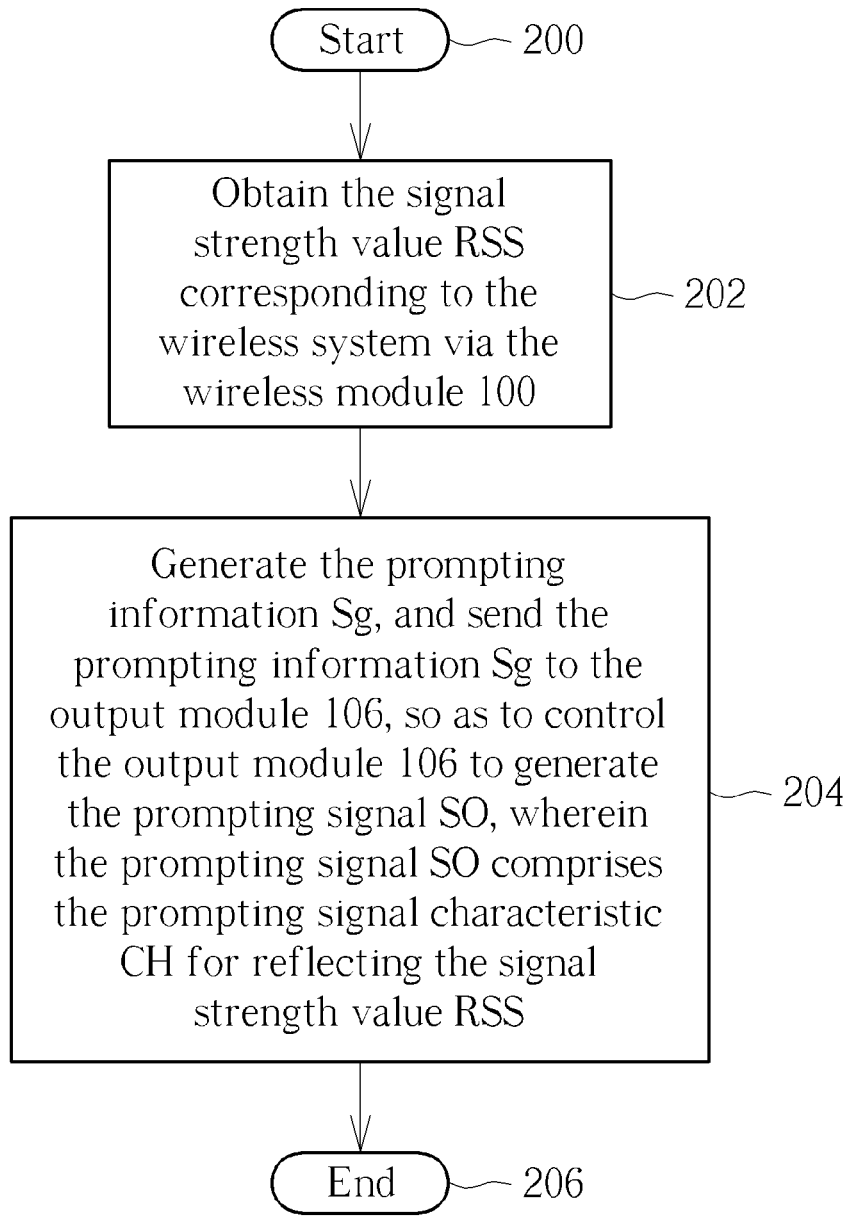
FIG. 2 is a schematic diagram of a prompting process according to an embodiment of the present invention.

The method of the wireless device 10 generating the prompting signal SO according to the signal strength value RSS can be summarized into a prompting process 20. FIG. 2 is a schematic diagram of the prompting process 20 according to an embodiment of the present invention. The prompting process 20 may be compiled as a program code 108 to be stored in the storage unit 104. The program code 108 may instruct the processor 102 to execute the prompting process 20. The prompting process 20 comprises the following steps:

Step 200: Start.

Step 202: Obtain the signal strength value RSS corresponding to the wireless system via the wireless module 100.

Step 204: Generate the prompting information Sg, and send the prompting information Sg to the output module 106, so as to control the output module 106 to generate the prompting signal SO, wherein the prompting signal SO comprises the prompting signal characteristic CH for reflecting the signal strength value RSS.

Step 206: End.

According to the prompting process 20, after theuser receives the prompting signal SO, the user may determine the variation condition of the signal strength value RSS according to a variation condition of the prompting signal characteristic CH. Specifically, in Step 202, after the wireless module 100 receives wireless signal from the wireless system via the antenna Ant, the wireless module 100 may calculate the signal strength value RSS corresponding to the wireless signal, and send the signal strength value RSS to the processor 102. Thus, the processor 102 obtains the signal strength value RSS corresponding to the wireless system via the wireless module 100. Moreover, the signal strength value RSS may be different system parameters corresponding to different wireless systems. For example, for the wireless local area network system (e.g., Wi-Fi) or the wireless cellular system (e.g., the 2G/3G/4G wireless communication system), the signal strength value RSS may be a received signal strength indicator (RSSI). For the wireless positioning system (e.g., global positioning system (GPS)), the signal strength value RSS may be a carrier to noise ratio (i.e., CNR or C/N) of the wireless positioning system.

In Step 204, the processor 102 generates the prompting information Sg and sends the prompting information Sg to the output module 106, so as to control the output module 106 to generate the prompting signal SO. In an embodiment, the processor 102 may divide a range of the signal strength value RSS into several divisions. The processor 102 may control the output module 106 to generate the prompting signal SO with a different prompting signal characteristic CH according to which division the signal strength value RSS lies in, i.e., the processor 102 generates the prompting information Sg comprising the prompting signal characteristic CH, and sends the prompting information Sg to the output module 106, so as to control the output module 106 to generate the prompting signal SO with the different prompting signal characteristic CH. For example, when the prompting signal SO is the sound signal snd, the prompting signal characteristic CH is the tone tn of the sound signal snd, and the output module 106 is the speaker module, in such a situation, the processor 102 may control the speaker module to generate the sound signal snd with the different tones tn according to TABLE I and the signal strength value RSS corresponding to different wireless systems, wherein different tones (or musical notes) represent the sound signals snd have different audio frequencies, and an audio frequency of a C5 tone (which a musical note thereof is Do) is twice of an audio frequency of a C4 tone (which a musical note thereof is also Do). Alternatively, in another embodiment, the output module may be a displaying module comprising a red light emitting diode (LED), a green LED and a blue LED. Hence, the prompting signal SO may be a displaying signal dsp displaying different colors. In this case, the prompting signal characteristic CH of the displaying signal dsp is the color COL of the displaying signal dsp. In such a situation, the processor 102 may transform the signal strength value RSS corresponding to different wireless system into the displaying signal dsp with different colors COL according to TABLE II.

TABLE I

| C/N of Wireless Positioning System | RSSI (dBm) of Wireless Cellular System | RSSI (dBm) of Wireless Local Area Network System | Tone tn (Musical Note) | Audio Frequency (Hz) |
|---|---|---|---|---|
| >50 | >−50 | >−55 | C5 (Do) | 523.25 |
| 49~44 | −51~−60 | −55~−60 | B4 (Si) | 493.88 |
| 43~48 | −61~−70 | −61~−66 | A4 (La) | 440.00 |
| 37~32 | −71~−80 | −67~−72 | G4 (Sol) | 392.00 |

TABLE I-continued

| C/N of Wireless Positioning System | RSSI (dBm) of Wireless Cellular System | RSSI (dBm) of Wireless Local Area Network System | Tone tn (Musical Note) | Audio Frequency (Hz) |
|---|---|---|---|---|
| 31~26 | −81~−90 | −73~−78 | F4 (Fa) | 349.23 |
| 25~20 | −91~−100 | −79~−84 | E4 (Mi) | 329.63 |
| 19~14 | −101~−110 | −85~−90 | D4 (Re) | 293.66 |
| <14 | <−110 | <−90 | C4 (Do) | 261.63 |

TABLE II

| C/N of Wireless Positioning System | RSSI (dBm) of Wireless Cellular System | RSSI (dBm) of Wireless Local Area Network System | Color COL |
|---|---|---|---|
| >50 | >−50 | >−55 | Red |
| 49~44 | −51~−60 | −55~−60 | Orange |
| 43~48 | −61~−70 | −61~−66 | Yellow |
| 37~32 | −71~−80 | −67~−72 | Green |
| 31~26 | −81~−90 | −73~−78 | Blue |
| 25~20 | −91~−100 | −79~−84 | Indigo |
| 19~14 | −101~−110 | −85~−90 | Violet |
| <14 | <−110 | <−90 | Black |

In addition, to prevent the signal strength value RSS sent from the wireless module 100 to the processor 102 from having rapid variation due to surge current or other factors, affecting determination of signal strength by the user, the processor 102 may perform a moving average (MA) or other average operation on the signal strength value RSS received from the wireless module 10, and then convert the averaged signal strength value RSS into the prompting signal SO with the prompting signal characteristic CH.

In another perspective, when the variation of the signal strength value RSS is not sufficient to cross the divisions either in TABLE I or TABLE II, due to small gain of the antenna Ant or other factors, to generate different prompting signal SO with different prompting signal characteristic CH, the processor 102 may automatically convert the signal strength value RSS into a sensitivity level Δ of the prompting signal SO, and generate the prompting signal SO with different prompting signal characteristic CH according to the signal strength value RSS and the sensitivity level Δ. For example, in an environment of the wireless cellular system, no matter how the user moves or rotates the wireless device 10, the RSSI received by the processor 102 may always be within a region which is greater than −89.8 dBm and smaller than −81.3 dBm, and thus, according to TABLE I (or TABLE II), the wireless device 10 would output the prompting signal SO with the same prompting signal characteristic CH, no matter how the user moves or rotates the wireless device 10. In this case, it is hard for the user to determine the variation condition of the signal strength value RSS according to the prompting signal SO. To bypass this problem, the processor 102 may automatically convert the signal strength value RSS into the sensitivity level Δ of the prompting signal SO, and generate the prompting signal SO with different prompting signal characteristic CH according to the signal strength value RSS and the sensitivity level Δ.

Specifically, in an embodiment, suppose that the signal strength value RSS received by the processor 102 at a specific time instant t0 is an signal strength value RSS0, the processor 102 may divide a range of the signal strength value RSS into a plurality of intervals according to the signal strength value RSS0 and the sensitivity level Δ, and generate the prompting signal SO with different prompting signal characteristic CH according to the signal strength values RSS received after the time instant t0. For example, the processor 102 may take the signal strength value RSS0 as a center and the sensitivity level Δ as a width, and form an interval centering at the signal strength value RSS0 with width of the sensitivity level Δ (i.e., the interval which the signal strength value RSS is greater than the signal strength value RSS0−0.5 Δ and smaller than RSS0+0.5 Δ). Further, the processor 102 may extend 4 intervals upward and 3 intervals downward (as TABLE III shows). Therefore, after the time instant t0, the processor 102 may map the received signal strength value RSS to the different prompting signal characteristic CH according to the 8 intervals in TABLE III, so as to control the output module 106 to generate the prompting signal SO with different prompting signal characteristics CH, i.e., the sound signal snd with different tones tn. Take RSSI being the signal strength value RSS as an example, when the signal strength value RSS received at the specific time instant t0 is −85 dBm and the sensitivity level Δ is 1 dBm, if the signal strength value RSS received by the processor 102 after the time instant t0 is −83 dBm, which lies in an interval between −83.5 dBm and −82.5 dBm, the processor 102 may control the output module 106 to generate the prompting signal SO with the tone tn as A4 (a musical note thereof is La). Therefore, the user may accurately grasp the subtle variation of the signal strength value RSS.

TABLE III

| the signal strength value RSS | Tone tn (Musical Note) | Audio Frequency (Hz) |
|---|---|---|
| >RSS0 + 3.5Δ | C5 (Do) | 523.25 |
| RSS0 + 2.5Δ~RSS0 + 3.5Δ | B4 (Si) | 493.88 |
| RSS0 + 1.5Δ~RSS0 + 2.5Δ | A4 (La) | 440.00 |
| RSS0 + 0.5Δ~RSS0 + 1.5Δ | G4 (Sol) | 392.00 |
| RSS0 − 0.5Δ~RSS0 + 0.5Δ | F4 (Fa) | 349.23 |
| RSS0 − 1.5Δ~RSS0 − 0.5Δ | E4 (Mi) | 329.63 |
| RSS0 − 2.5Δ~RSS0 − 1.5Δ | D4 (Re) | 293.66 |
| <RSS0 − 2.5Δ | C4 (Do) | 261.63 |

In another perspective, the processor 102 may generate the sensitivity level Δ according to a time variation condition of the signal strength value RSS. For example, the time variation condition may be an amount of change of the signal strength value RSS within a certain period of time. In an embodiment, if the amount of change of the signal strength value RSS within a period of time T is smaller than a certain value, the processor 102 may generate the sensitivity level Δ as 1 dBm. Moreover, the amount of change of the signal strength value RSS may be selected from statistics, such as full range, standard deviation, etc., of the signal strength value RSS received by the processor 102 within the certain period of time, and not limited herein.

Figure 3:
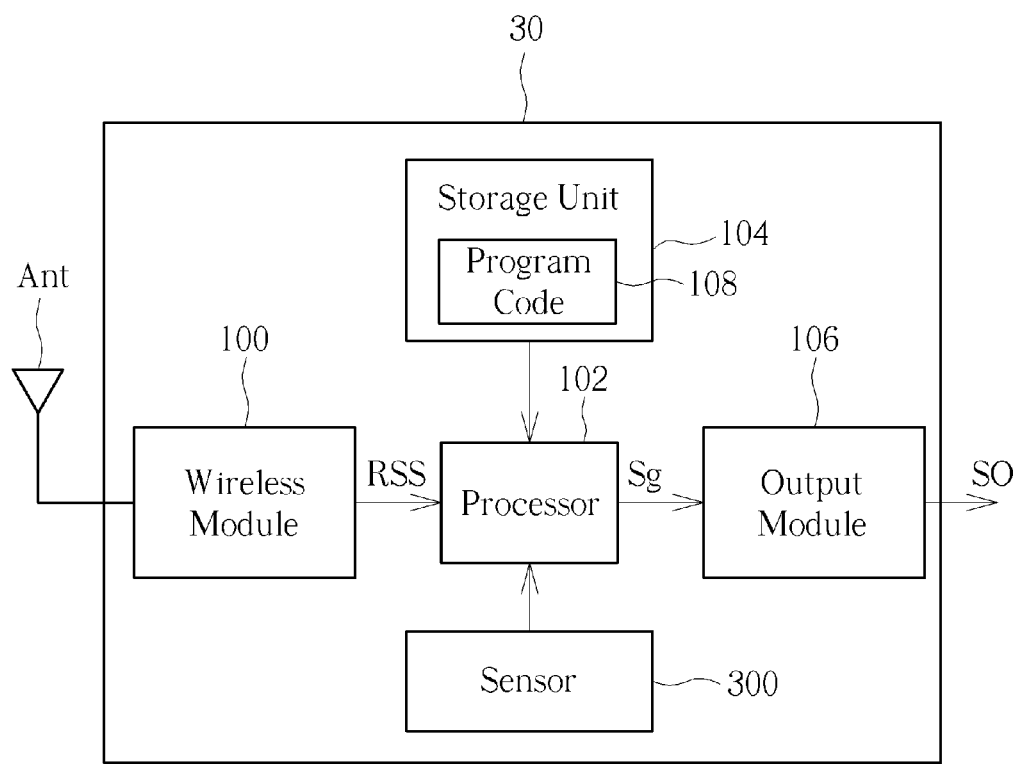
FIG. 3 is a schematic diagram of a wireless device according to an embodiment of the present invention.

Furthermore, FIG. 3 is a schematic diagram of a wireless device 30 according to an embodiment of the present invention. The wireless device 30 is similar to the wireless device 10, and thus, same symbols employ the same notations. Different from the wireless device 10, the wireless device 30 comprises a sensor 300. The sensor 300 may be a gravity sensor (G Sensor), for sensing a dynamic condition, such as shifting, rotation, etc., of the wireless device 30. The sensor 300 may further send the dynamic condition of the wireless device 30 to the processor 102, and the processor 102 may generate the sensitivity level Δ according to the time variation condition and the dynamic condition of the wireless device 30. For example, if the sensor 300 senses a shift of the wireless device 30 within the time period T is greater than a specific shifting value, and the amount of change of the signal strength value RSS is smaller than a specific value, which represents the wireless device 30 is moved by the user but no significant change of the prompting signal characteristic CH of the prompting signal SO is caused, the processor 102 may generate the sensitivity level Δ with smaller value (i.e., 0.5 dBm), to generate the prompting signal SO with a different prompting signal characteristic CH. Therefore, the user may accurately grasp the subtle variation of the signal strength value RSS.

According to the prompting process 20, the wireless device of the present invention may generate the prompting signal according to the signal strength value, wherein the prompting signal has the prompting signal characteristic for reflecting the variation condition of the signal strength value. The user does not have to stare at the monitor of the wireless device, but grasp the variation condition of the signal strength value when shifting or rotating the wireless device, to obtain better received signal quality. Notably, the embodiments stated in the above are utilized for illustrating concepts of the present invention. Those skilled in the art may make modifications and alternations accordingly, and not limited herein. For example, in the embodiment stated in the above, the processor 102 divides the range of the signal strength value RSS into several divisions, which is not limited thereto. The processor 102 may map the signal strength value RSS to the sound signal snd with a specific audio frequency, wherein the mapping relationship is:

$$\text{Audio Frequency}=F(\text{RSS}) \quad \text{(eqn. 1)};$$

wherein F( ) represent a continuous monotonic function, which may be a monotonic increasing function or a monotonic decreasing function, and not limited herein. In addition, the prompting signal characteristic CH of the prompting signal SO is not limited to be a tone (or an audio frequency) of the sound signal or a color of the displaying signal. The prompting signal characteristic CH of the prompting signal SO may also be a volume of the sound signal or a brightness of the displaying signal. In addition, the sensitivity level Δ is not limited to be automatically generated by the processor 102, the sensitivity level Δ may be manually input by the user, so as to grasp the subtle variation of the signal strength value RSS.

In summary, the wireless device of the present invention may generate the prompting signal according to the signal strength value, wherein the prompting signal has the prompting signal characteristic for reflecting the variation condition of the signal strength value. The user does not have to stare at the monitor of the wireless device, but grasp the variation condition of the signal strength value when shifting or rotating the wireless device, to obtain better received signal quality.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A prompting method, utilized in a wireless device, the prompting method comprising:
   obtaining a signal strength value corresponding to a wireless system;
   determining a prompting signal characteristic according to the signal strength value; and outputting a prompting sound signal, the prompting sound signal having the prompting signal characteristic for reflecting the signal strength value;

wherein the prompting signal characteristic is a tone or a volume of the prompting sound signal.

2. The prompting method of claim 1, wherein the wireless system is selected from a wireless body area network system, a wireless personal area network system, a wireless local area network system, a wireless cellular system, or a wireless positioning system.

3. The prompting method of claim 1, wherein the step of outputting the prompting signal, the prompting signal having the prompting signal characteristic for reflecting the signal strength value further comprises:

obtaining a sensitivity level; and outputting the prompting signal according to the signal strength value and the sensitivity level.

4. The prompting method of claim 3, wherein the step of obtaining the sensitivity level comprises:

obtaining a time variation condition of the signal strength value varying with respect to time; and generating the sensitivity level according to the time variation condition.

5. The prompting method of claim 4, wherein the step of generating the sensitivity level according to the time variation condition further comprises:

obtaining a dynamic condition of the wireless device; and generating the sensitivity level according to the time variation condition and the dynamic condition.

6. A wireless device, comprising:

an output module;

a wireless module, configured to receive a signal from a wireless system and measure a signal strength value of the wireless system;

a processor, coupled to the output module and the wireless module; and a storage unit, for storing a program code, the program code instructing the processor to perform following steps:

obtain the signal strength value corresponding to the wireless system;

determining a prompting signal characteristic according to the signal strength value; and control the output module to output a prompting sound signal, the prompting sound signal having the prompting signal characteristic for reflecting the signal strength value;

wherein the prompting signal characteristic is a tone or a volume of the prompting sound signal.

7. The wireless device of claim 6, wherein the wireless system is selected from a wireless body area network system, a wireless personal area network system, a wireless local area network system, a wireless cellular system, or a wireless positioning system.

8. The wireless device of claim 6, wherein the program code further instructs the processor to perform following steps:

obtain a sensitivity level; and outputting the prompting signal according to the signal strength value and the sensitivity level.

9. The wireless device of claim 8, wherein the program code further instructs the processor to perform following steps:

obtain a time variation condition of the signal strength value varying with respect to time; and generate the sensitivity level according to the time variation condition.

10. The wireless device of claim 9, further comprising a sensor, for sensing a dynamic condition of the wireless device.

11. The wireless device of claim 10, wherein the program code further instructs the processor to perform following steps:

obtain the dynamic condition of the wireless device from the sensor; and generate the sensitivity level according to the time variation condition and the dynamic condition.

12. A prompting method, utilized in a wireless device, the prompting method comprising:

obtaining a signal strength value corresponding to a wireless system;

determining a prompting signal characteristic according to the signal strength value; and outputting a prompting display signal, the prompting display signal having the prompting signal characteristic for reflecting the signal strength value;

wherein the prompting signal characteristic is a color or a brightness of the prompting display signal.

13. The prompting method of claim 12, wherein the step of outputting the prompting signal, the prompting signal having the prompting signal characteristic for reflecting the signal strength value further comprises:

obtaining a sensitivity level; and outputting the prompting signal according to the signal strength value and the sensitivity level.

14. The prompting method of claim 13, wherein the step of obtaining the sensitivity level comprises:

obtaining a time variation condition of the signal strength value varying with respect to time; and generating the sensitivity level according to the time variation condition.

15. The prompting method of claim 14, wherein the step of generating the sensitivity level according to the time variation condition further comprises:

obtaining a dynamic condition of the wireless device; and generating the sensitivity level according to the time variation condition and the dynamic condition.

16. A wireless device, comprising:

an output module;

a wireless module, configured to receive a signal from a wireless system and measure a signal strength value of the wireless system;

a processor, coupled to the output module and the wireless module; and a storage unit, for storing a program code, the program code instructing the processor to perform following steps:

obtain the signal strength value corresponding to the wireless system;

determining a prompting signal characteristic according to the signal strength value; and control the output module to output a prompting display signal, the prompting display signal having the prompting signal characteristic for reflecting the signal strength value;

wherein the prompting signal characteristic is a color or a brightness of the prompting display signal.

17. The wireless device of claim 16, wherein the program code further instructs the processor to perform following steps:

obtain a sensitivity level; and outputting the prompting signal according to the signal strength value and the sensitivity level.

18. The wireless device of claim 17, wherein the program code further instructs the processor to perform following steps:
   obtain a time variation condition of the signal strength value varying with respect to time; and
   generate the sensitivity level according to the time variation condition.

19. The wireless device of claim 18, further comprising a sensor, for sensing a dynamic condition of the wireless device.

20. The wireless device of claim 19, wherein the program code further instructs the processor to perform following steps:
   obtain the dynamic condition of the wireless device from the sensor; and
   generate the sensitivity level according to the time variation condition and the dynamic condition.

* * * * *